(12) United States Patent
Ji et al.

(10) Patent No.: US 12,231,895 B2
(45) Date of Patent: Feb. 18, 2025

(54) DETECTING SIDELINK ATTACKS

(71) Applicant: Nokia Technologies Oy, Espoo (FI)

(72) Inventors: Lianghai Ji, Aalborg (DK); Prajwal Keshavamurthy, Munich (DE); Nuno Manuel Kiilerich Pratas, Gistrup (DK); Daniel Medina, Munich (DE)

(73) Assignee: Nokia Technologies Oy, Espoo (FI)

( * ) Notice: Subject to any disclaimer, the term of this patent is extended or adjusted under 35 U.S.C. 154(b) by 370 days.

(21) Appl. No.: 17/820,951

(22) Filed: Aug. 19, 2022

(65) Prior Publication Data

US 2023/0056399 A1 Feb. 23, 2023

(30) Foreign Application Priority Data

Aug. 23, 2021 (EP) .................................. 21192623

(51) Int. Cl.
*H04W 12/122* (2021.01)
*H04L 5/00* (2006.01)
*H04W 12/108* (2021.01)
*H04W 72/20* (2023.01)

(52) U.S. Cl.
CPC ......... *H04W 12/122* (2021.01); *H04L 5/0053* (2013.01); *H04W 12/108* (2021.01); *H04W 72/20* (2023.01)

(58) Field of Classification Search
None
See application file for complete search history.

(56) References Cited

U.S. PATENT DOCUMENTS

| | | | |
|---|---|---|---|
| 8,584,236 B2 | 11/2013 | El-Moussa et al. | |
| 8,713,675 B2 | 4/2014 | Zugenmaier et al. | |
| 10,200,862 B2 | 2/2019 | Nair et al. | |
| 2017/0214486 A1 | 7/2017 | Choi et al. | |
| 2020/0236537 A1 | 7/2020 | Lee et al. | |
| 2020/0351704 A1* | 11/2020 | Yu .......................... | H04W 72/21 |

(Continued)

FOREIGN PATENT DOCUMENTS

WO 2020/065585 A1 4/2020

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.4.0, Dec. 2020, pp. 1-391.

(Continued)

*Primary Examiner* — Frantz Bataille
(74) *Attorney, Agent, or Firm* — Nokia Technologies Oy

(57) ABSTRACT

There is provided an apparatus for a sidelink, SL, communication comprising means for transmitting a transport block, TB, via the SL communication, means for receiving a feedback in response to the transmitted TB, means for storing information contained in the transmitted TB upon receiving said feedback, means for receiving a status report comprising information associated with the TB, and means for comparing said information contained in the status report with said stored information contained in the transmitted TB in order to identify an attacker based on discrepancy between said information contained in the status report and said stored information contained in the transmitted TB.

19 Claims, 4 Drawing Sheets

(56) References Cited

U.S. PATENT DOCUMENTS

2021/0329489 A1* 10/2021 Damnjanovic ..... H04L 41/0803
2021/0400713 A1* 12/2021 He ..................... H04W 72/21

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

"3rd Generation Partnership Project; Technical Specification Group Radio Access Network; NR; Physical layer procedures for control (Release 16)", 3GPP TS 38.213, V16.4.0, Dec. 2020, pp. 1-181.

Emami et al., "SNACK: An efficient intrusion detection system in Mobile Ad-Hoc Network based on the Selective-Negative Acknowledgement algorithm", IEEE 28th Canadian Conference on Electrical and Computer Engineering (CCECE), May 3-6, 2015, pp. 903-907.

Extended European Search Report received for corresponding European Patent Application No. 21192623.3, dated Jan. 24, 2022, 8 pages.

Notice of Allowance received for corresponding European Patent Application No. 21192623.3, dated Mar. 1, 2024, 8 pages.

\* cited by examiner

DETECTING SIDELINK ATTACKS

FIELD

Various example embodiments relate to a method, an apparatus, a computer program and a computer program product for detection of attacks of a sidelink, SL, communication.

BACKGROUND

Jamming relates to a deliberate interference or blocking of communications. Jamming antennas may interfere with radio noise or signals. In jammer attacks malicious nodes block the legitimate communication by causing intentional interference in the network. For example, if a jamming device sends initiation data packets, the receiver may begin to establish a two-way data transmission. Instead of completing the establishment or a handshake, the jammer loops back to the beginning and the receiver is jammed in an infinite loop, where it keeps initiating the connection, which is never completed. An infinite loop may effectively block all legitimate communication. A jammer attack may be detected and localized, for example via triangulation, by outside observers.

In addition, in case of a sophisticated attack an attacker may behave as a normal receiver, such as a normal User Equipment, UE. In recent years, communication systems have started to be the target of more sophisticated attacks, where instead of jamming the full or part of the bandwidth, an attacker behaves as a normal UE to disrupt the communication system, such that its attack behaviour may not be easily detected and it can avoid being penalized.

SUMMARY

There is provided detection of sidelink, SL, attacks, enabling defending SL communication from an attacker, which appears to behave like a normal network entity.

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided a method for a sidelink, SL, communication, comprising:
means for transmitting a transport block, TB, via the SL communication,
means for receiving a feedback in response to the transmitted TB,
means for storing information contained in the transmitted TB upon receiving said feedback,
means for receiving a status report comprising information associated with the TB, and
means for comparing said information contained in the status report with said stored information contained in the transmitted TB in order to identify an attacker based on discrepancy between said information contained in the status report and said stored information contained in the transmitted TB.

According to a second aspect, there is provided a method for a sidelink, SL, communication, comprising:

transmitting a transport block, TB, via the SL communication,
receiving a feedback in response to the transmitted TB,
storing information contained in the transmitted TB upon receiving said feedback,
receiving a status report comprising information associated with the TB, and
comparing said information contained in the status report with said stored information contained in the transmitted TB in order to identify an attacker based on discrepancy between said information contained in the status report and said stored information contained in the transmitted TB.

According to a third aspect, there is provided a (non-transitory) computer readable medium comprising program instructions that, when executed by at least one processor, cause an apparatus to perform at least:
to transmit a transport block, TB, via the SL communication,
to receive a feedback in response to the transmitted TB,
to store information contained in the transmitted TB upon receiving said feedback,
to receive a status report comprising information associated with the TB, and
to compare said information contained in the status report with said stored information contained in the transmitted TB in order to identify an attacker based on discrepancy between said information contained in the status report and said stored information contained in the transmitted TB.

According to a fourth aspect, there is provided a computer program configured to cause the method of the second aspect to be performed.

According to a fifth aspect, there is provided an apparatus configured to
transmit a transport block, TB, via the SL communication,
receive a feedback in response to the transmitted TB,
store information contained in the transmitted TB upon receiving said feedback,
receive a status report comprising information associated with the TB, and
compare said information contained in the status report with said stored information contained in the transmitted TB in order to identify an attacker based on discrepancy between said information contained in the status report and said stored information contained in the transmitted TB.

DETAILED DESCRIPTION

There is provided a UE implementation enabling to identify existence of an attacker in a sidelink, SL, communication. In a unicast SL communication between a transmitter TX UE and a receiver RX UE, an attacker may overhear transmission. The receiver RX UE may be referred to as a legitimate receiver. The attacker may perform fake acknowledgements as a feedback, like a hybrid automatic repeat request, HARQ feedback. The TX UE is configured to store information contained in one or more transport blocks, TBs, for which the TX UE has received feedback, such as a negative acknowledgement, NACK, or a positive acknowledgement, ACK. The TX UE receives a status report comprising information contained in the TB and compares the status report with the stored information contained in the transmitted TB. In case of a discrepancy of the data between said information contained in the status report and said stored information contained in the transmitted TB, an existence of an attacker may be identified. The TX UE may inform the RX UEs and the network, NW, on the identified attacker. The HARQ feedback may be disabled and/or NW configuration adapted in response to the identified existence of an attacker.

Figure 1:
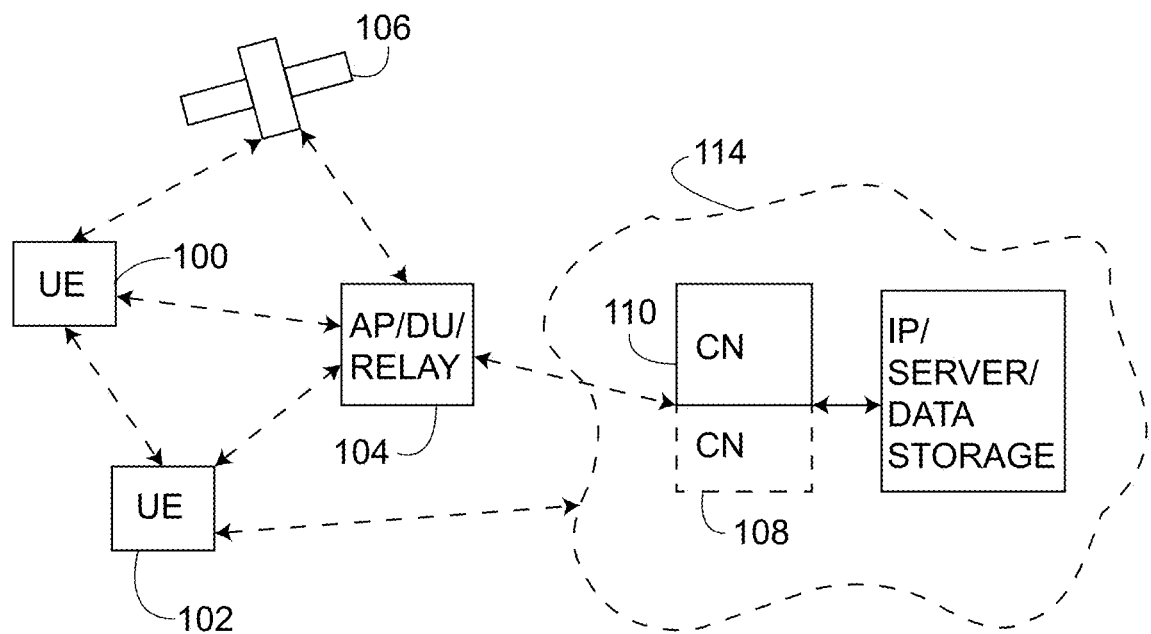
FIG. 1 shows, by way of example, a network architecture of a communication system in accordance with at least some embodiments.

FIG. 1 shows, by way of an example, a network architecture of communication system. An example of an access architecture is a radio access architecture based on long term evolution advanced (LTE Advanced, LTE-A) or new radio (NR), also known as fifth generation (5G), without restricting to such an architecture, however. Some examples of other options for suitable systems are the universal mobile telecommunications system, UMTS, radio access network, UTRAN or E-UTRAN, long term evolution, LTE, which is the same as E-UTRA, wireless local area network, WLAN or WiFi, worldwide interoperability for microwave access, WiMAX, Bluetooth®, personal communications services, PCS, ZigBee®, wideband code division multiple access, WCDMA, systems using ultra-wideband, UWB, technology, sensor networks, mobile ad-hoc networks, MANETs, and Internet Protocol multimedia subsystems, IMS, or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB, eNodeB, 104 providing the cell. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may be an interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110, CN, or next generation core, NGC. Depending on the system, the counterpart on the CN side can be a serving gateway, S-GW, for routing and forwarding user data packets, packet data network gateway, P-GW, for providing connectivity of user devices, UEs, to external packet data networks, or mobile management entity, MME, etc. An example of the network node configured to operate as a relay station is integrated access and backhaul node, IAB. The distributed unit (DU) part of the IAB node performs BS functionalities of the IAB node, while the backhaul connection is carried out by the mobile termination, MT, part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module, SIM, including, but not limited to, the following types of devices: a mobile station, a mobile phone, a smartphone, a personal digital assistant, PDA, a handset, a device using a wireless modem, like an alarm or a measurement device, a laptop and/or a touch screen computer, a tablet, a game console, a notebook and a multimedia device. It should be appreciated that a user device may also be a nearly exclusive uplink only device, of which an example is a camera or video camera loading images or video clips to a network. A user device may also be a device having capability to operate in Internet of Things, IoT, network which is a scenario in which objects are provided with the ability to transfer data over a network without requiring human-to-human or human-to-computer interaction.

Additionally, although the apparatuses have been depicted as single entities, different units, processors and/or memory units may be implemented inside these apparatuses, to enable the functioning thereof.

5G enables using multiple input—multiple output, MIMO, technology at both UE and gNB side, many more base stations or nodes than the LTE, a so-called small cell concept, including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, such as massive machine-type communications, mMTC, including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz—cmWave, below 7 GHz cmWave—mmWave). One of the concepts considered to be used in 5G networks is network slicing in which multiple independent and dedicated virtual sub-networks or network instances may be created within the same infrastructure to run services that have different requirements on latency, reliability, throughput and mobility.

The communication system is also able to communicate with other networks, such as a public switched telephone network or the Internet or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network, RAN, by utilizing network function virtualization, NVF, and software defined networking, SDN. Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side, in a distributed unit, DU, 104, and non-real time functions being carried out in a centralized manner, in a centralized unit, CU, 108.

5G may also utilize satellite communication to enhance or complement the coverage of 5G service, for example by providing backhauling. Possible use cases are providing service continuity for machine-to-machine, M2M, or Internet of Things, IoT, devices or for passengers on board of vehicles, or ensuring service availability for critical communications, and future railway/maritime/aeronautical communications. Satellite communication may utilise geostationary earth orbit, GEO, satellite systems, but also low earth orbit, LEO, satellite systems, in particular mega-constellations or systems in which hundreds of (nano)satellites are deployed. Each satellite 106 in the constellation may cover several satellite-enabled network entities that create on-ground cells. The on-ground cells may be created through an on-ground relay node 104 or by a gNB located on-ground or in a satellite.

Figure 2:
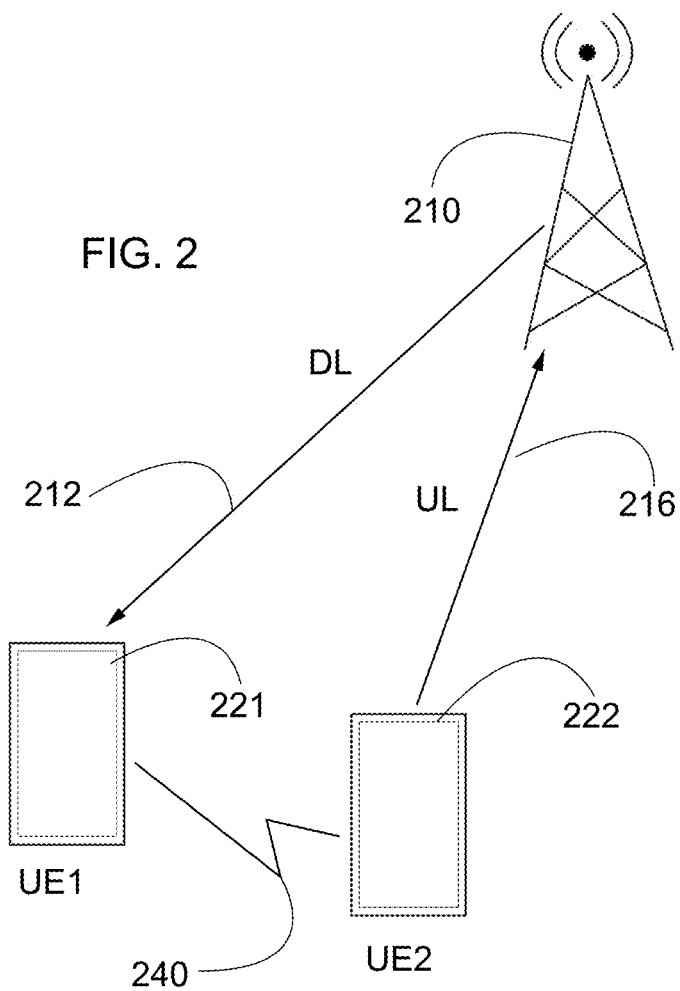
FIG. 2 shows, by way of example, a system in accordance with at least some embodiments.

FIG. 2 shows, by way of example, a system in accordance with at least some embodiments. The system of FIG. 2 comprises devices UE1 221 and UE2 222, and an eNB node or a base station, BS 210. The base station, BS, 210 comprises an access point or an interfacing device including a relay station capable of operating in a wireless environment. The BS 210 network node includes or is coupled to transceivers. From the transceivers of the network node, a connection is provided to an antenna unit that establishes bi-directional radio links to user devices. The antenna unit may comprise a plurality of antennas or antenna elements. A physical link from a user device, UE2 222, to the BS 210 is called uplink, UL 216, or reverse link, and the physical link from the BS 201 to the UE1 221 is called downlink, DL 212, or forward link.

The devices UE1 221 and UE2 222 are capable of direct communication without employing a BS 210. This may be enabled by a sidelink, SL, 240 between the devices UE1 221 and UE2 222. A SL has been defined by 3GPP for enabling public safety communications. A LTE SL is an adaptation of the core LTE standard that allows communication between two or more nearby devices, using E-UTRAN technology without a BS. The SL may be utilized for out of network coverage scenario, or the functionality may be used in conjunction with LTE connections to mobile networks. This enables a wide variety of connected services to be implemented. Sidelink proximity services may allow devices to discover and communicate with one another at high data rates and low latency. This enhances peer-to-peer gaming and streaming services, smart factories, IoT implementations, virtual reality, augmented reality and other wearable device communications. Sidelink may enable mission-critical industrial applications and provide public safety ensuring direct communication or relayed communication between devices. In contrast to UL 216 and DL 212, where resource allocation and link adaptation are controlled by the network, for a SL 240 a device may perform the functions. A sidelink, SL, refers to a channel structure including a logical channel, a transport channel and a physical channel, which are used in the air interface to realize SL communication between devices. A physical SL control channel, PSCCH, contains sidelink control information, SCI, which is configured to carry information for enabling the receiver UEs to receive and demodulate the PSSCH. The SCI may be sent in advance to any data block.

In a SL communication, a UE is configured with one or more sidelink resource pools. A resource pool comprises a set of resources assigned to the SL operation. A resource pool may comprise subframes and resource blocks within the subframes. A sidelink resource pool may be configured for transmission of PSSCH, for reception of PSSCH, and associated with a sidelink resource allocation mode 1 or mode 2. Resources for SL communication may be implemented by two alternative modes, mode 1 and mode 2. The mode 1 is based on using scheduled resources or grants from a serving BS. In the mode 1 TX UE may be connected to the BS, or to the communication network, thus in radio resource control, RRC, connected state, in order to get the SL resources allocated in accordance to mode 1. Resources assigned for the SL may be taken from the UL. The network, NW, controls the resource and it may assign specific resources or a pool of resources to the TX UE. In mode 2 there is no such NW control, but the UE uses resources preconfigured in the UE, for example in the universal subscriber identification module, USIM of the universal integrated circuit card, UICC. The mode 2 is based on autonomous resource allocation or selection by the TX UE. The resources may be selected from a preconfigured TX resource pool. The selection may be based on a random selection or on a wireless channel sensing based selection. The random selection may be utilized with specific operations or situations with a particular, preconfigured resource pool, for example. The sensing based selection may be utilized in any operations. The mode 2 enables SL to be implemented irrespective of a TX UE being in coverage, IC, or out of coverage, OoC, of the network, BS or radio resources. The mode 2 may be utilized even if a current state of a TX UE is RRC idle, RRC inactive or RRC connected. This also applies, when TX UE is in coverage of a different communication network, or when one of the UEs in SL communication is IC and the other one is OoC.

A protocol stack used for SL communications may comprise the following layers: a physical, PHY, a medium access control, MAC, a radio link control, RLC, a packet data convergence protocol, PDCP, an internet protocol—an address resolution protocol, IP-ARP, and an application. The layers may be configured in response to reception of the first RLC packet data unit, PDU. MAC layer may support feedback processes. In order to identify the transmitter UE and the group of UEs for which the data packet is intended to be sent, two identifiers, IDs, are provided. The IDs may be provided by the network or configured in an UE. An UE ID may be used as a source field in a MAC PDU. A layer 2 group ID may be used to identify the receiver UEs. The layer 2 group ID may be used in a control channel for filtering data packets at the physical layer and in a MAC PDU to identify the receivers UE. The logical channel ID, the UE ID and the group ID of the layer 2 ID may enable identifying the PDCP/RLC pair to be used in the receiver UE. The receiver UE is configured to maintain a PDCP/RLC pair for the established logical channel in order to receive SL transmission from the transmitter UE.

One of the UEs of FIG. 2 is so-called transmitter UE, TX UE. A transmitter UE transmits SL information to a receiver UE, RX UE, to a group of RX UEs or to all RX UEs in proximity of the transmitter UE. The TX UE is configured to transmit information using a preconfigured resource pool and to transmit at least SL control information, SCI. The SCI is used for a scheduling assignment for a SL data transmission. The RX UE is configured to monitor over the preconfigured resource pool in order to receive the SL information, or at least SCI instances, preferably all SCI instances, and to determine whether a received SCI and corresponding SL data transmission is meant for the RX UE to receive or not. The decision on receiving or not is based on source and/or destination identifiers, IDs, as indicated in the received SCI instances. A source corresponds to TX UE side and a destination corresponds to RX UE side. SL may comprise unicast, groupcast or broadcast.

With aid of SCI, a receiver UE is able to identify on the physical layer, whether the data packed is intended for it. In addition, the receiver UE is able to deduce information for demodulating from the received SCI. The SCI may comprise information about the number of allocated resource blocks and their location, indication of subframes used for the data part, modulation and coding scheme, a group destination ID. In addition, a timing advance indication may be provided for the mode 1, and a frequency hopping information may be included. The group destination ID, which may be used for a receiver selection on the physical layer, corresponds to corresponding part of the layer 2 group ID. The group destination ID may be accompanied with the other part of the layer 2 group ID in order to uniquely identify the receiver group.

Figure 3:
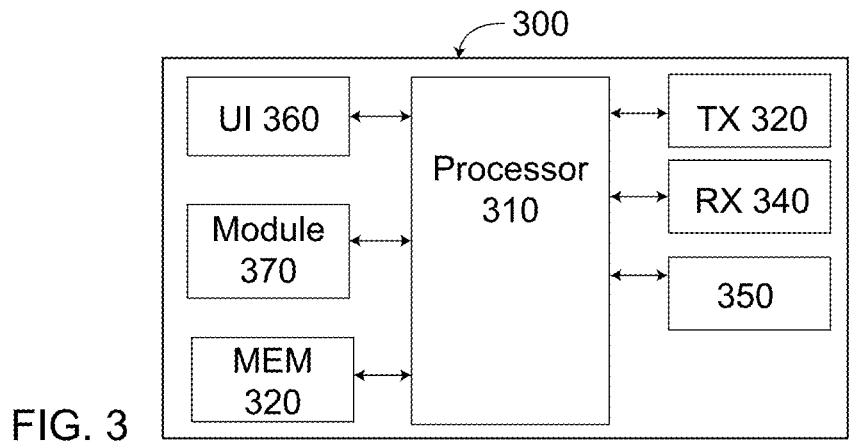
FIG. 3 shows, by way of example, a block diagram of an apparatus in accordance with at least some embodiments.

FIG. 3 shows, by way of example, an apparatus capable of sidelink communication. Illustrated is device 300, which may comprise, for example, a mobile communication device such as mobile 100 of FIG. 1, or a UE1 221 or UE2 222 of FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some example embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected.

Figure 4:
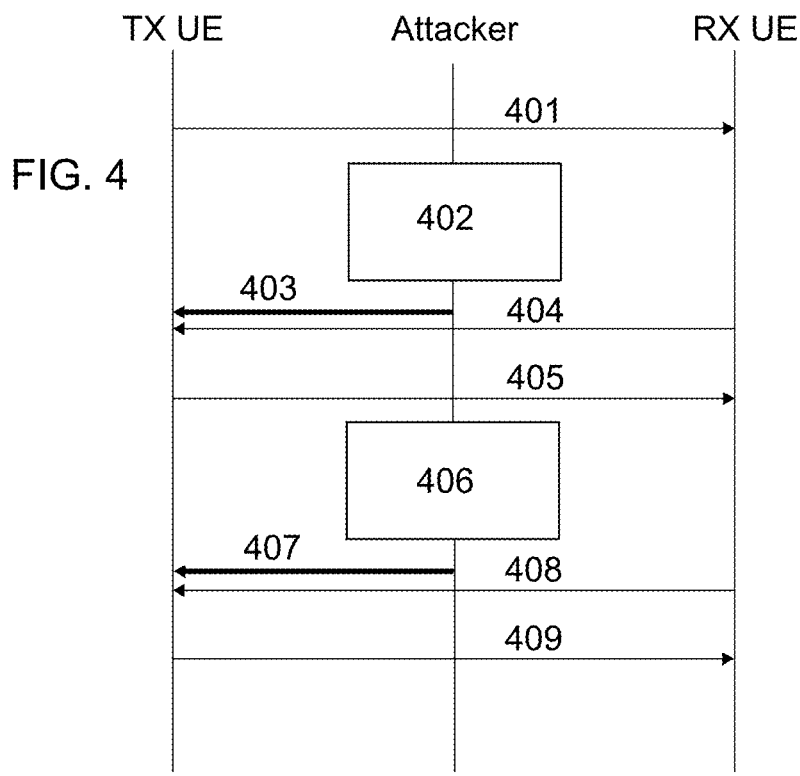
FIG. 4 shows, by way of example, signalling between devices in a sidelink communication in accordance with at least some embodiments.

FIG. 4 illustrates, by way of an example, signalling in between devices in a sidelink communication in accordance with at least some embodiments. On the vertical axes are disposed, on the left, a transmitter UE, TX UE, and on the right, a receiver UE, RX UE. An attacker is illustrated in the middle. The attacker illustrates an intruder in contrary to legitimate participants, here the TX UE and the RX UE, of the SL. Time advances from the top toward the bottom. The TX UE is configured to transmit SL information to the RX UE. For simplicity, a unicast SL communication between the TX UE and the RX UE is illustrated in FIG. 4. SL data is transmitted from the TX UE to the RX UE, while signalling between the TX UE and RX UE is bi-directional. The RX UE is configured to monitor SL information, to receive SCI instances and to determine, which SL transmissions are directed to the RX UE based on source ID of TX UE side and on destination ID of RX UE side.

At phase 401, the TX UE is configured to transmit a transport block, TB, which comprises for example sidelink control information, SCI, and a corresponding data payload. The transmission is made over allocated physical sidelink control channel/physical sidelink share channel, PSCCH/PSSCH, resources. A physical sidelink feedback channel, PSFCH, resource is associated to the PSCCH/PSSCH resources. Mapping between the PSCCH/PSSCH transmission/reception and the corresponding PSFCH resource may be implemented as specified in 3GPP TS 38.213. Parties of the SL, the TX UE and the RX UE are aware of location of PSFCH resource, which is used for transmitting a hybrid automatic repeat request, HARQ, feedback by the RX UE. The HARQ enables a TX UE to be aware of the reception status at the one or multiple RX UEs. The PSFCH resource depends on PSCCH/PSSCH resource and on layer 1, L1, source ID carried in the second stage SCI. The TX UE transmission via SL is received by the RX UE.

At phase 404, the RX UE, which received the TB at phase 401, is configured to transmit an acknowledgement back to the TX UE. The RX UE is configured to decode the received TB. The RX UE is configured to transmit a negative acknowledgement, NACK, via PSFCH, if the RX UE fails to decode the transport block, TB, after decoding the associated SCI. The RX UE is configured to transmit acknowledgement, ACK, on PSFCH, if it successfully decodes the received TB. However, in FIG. 4 an attacker is illustrated to disturb the SL communication between the TX UE and the RX UE. ACK and NACK may be referred to as feedback in general.

At phase 402, the attacker of FIG. 4, is imitating a normal UE. The attacker is able to disrupt the SL communication. The attacker may overhear the PSCCH/PSSCH transmission form the TX UE to the RX UE. The attacker is able to get the initial transmission of the TX UE over the PSSCH/PSSCH. The attacker may decode the SCI and obtain the associated PSFCH resource. Based on the overheard TB and the decoded SCI, the attacker may derive the PSFCH resource, which is to be used for sending HARQ feedback, and which is associated to the PSCCH/PSSCH, which was used for the transmission at phase 401.

At phase 403, the attacker upon decoding the unicast transmission of phase 401, may transmit feedback like a negative acknowledgement, NACK, over the PSFCH resource. This may be called a fake NACK. The fake NACK is transmitted to TX UE.

At phase 405, the TX UE is configured to retransmit the original TB. The TX UE is not able to detect a NACK of a legitimate receiver, like the RX UE, form a fake NACK from an attacker. The retransmission is made over the same PSCCH/PSSCH as the original transmission at phase 401. The retransmission is due to receiving a NACK. In this case, the retransmission may be due to the fake NACK received from the attacker at phase 403.

At phase 406, the attacker may decode the retransmitted SCI and obtains the PSFCH resource.

At phase 407, the attacker is configured to send a false NACK to the TX UE.

At phase 408, the legitimate receiver of the transmission, the RX UE, is configured to send an ACK or a NACK in response to the retransmitted TB.

At phase 409, in response to received false NACK, the TX UE is configured to retransmit the TB over the PSCCH/PSSCH. This may lead to repeating of phases 405-409. The TX UE may keep performing unnecessary retransmissions, reTX. The retransmission may keep the TX UE busy or occupied, which may lead to missing its own SL reception due to half-duplex, in which transmission and reception cannot be performed simultaneously. The false NACK type of attack may cause a high load or congestion due to unnecessary retransmission from the TX UE, in response to a NACK from the attacker, even though the intended RX UE may have received the transmission successfully.

Alternatively, at phase 403 and/or at phase 407, the attacker may send a fake ACK instead of the fake NACK as described in the previous. Similarly, the attacker may overhear the SL transmission, decode a unicast transmission in the PSCCH/PSSCH, obtain the associated PSFCH resource, and use it for transmission of the fake ACK to the TX UE. In response of receiving an ACK or a fake ACK, the TX UE may be configured to assume that the transmission to the RX UE was successful. In this case, no retransmission is performed. This may degrade reliability in case the RX UE did not receive the transmitted TB or decode the PSCCH/PSSCH successfully.

The TX UE may receive via PSFCH resource both ACK and NACK, wherein one of those is a fake one. For example, the RX UE may send an ACK to the TX UE, while the attacker may send a false NACK to the TX UE, as a feedback to the transmission over SL. Or the other way around; the RX UE may send a NACK to the TX UE, while the attacker may send a false ACK to the TX UE, as a feedback to the transmission over SL. In such cases, it depends on the configuration and implementation of the TX UE, whether it performs a retransmission or not. In view of reliability, for example, a retransmission of the same TB may be implemented in response to a received NACK. A NACK and a fake NACK are handled similarly and not distinguished by the TX UE.

Figure 5:
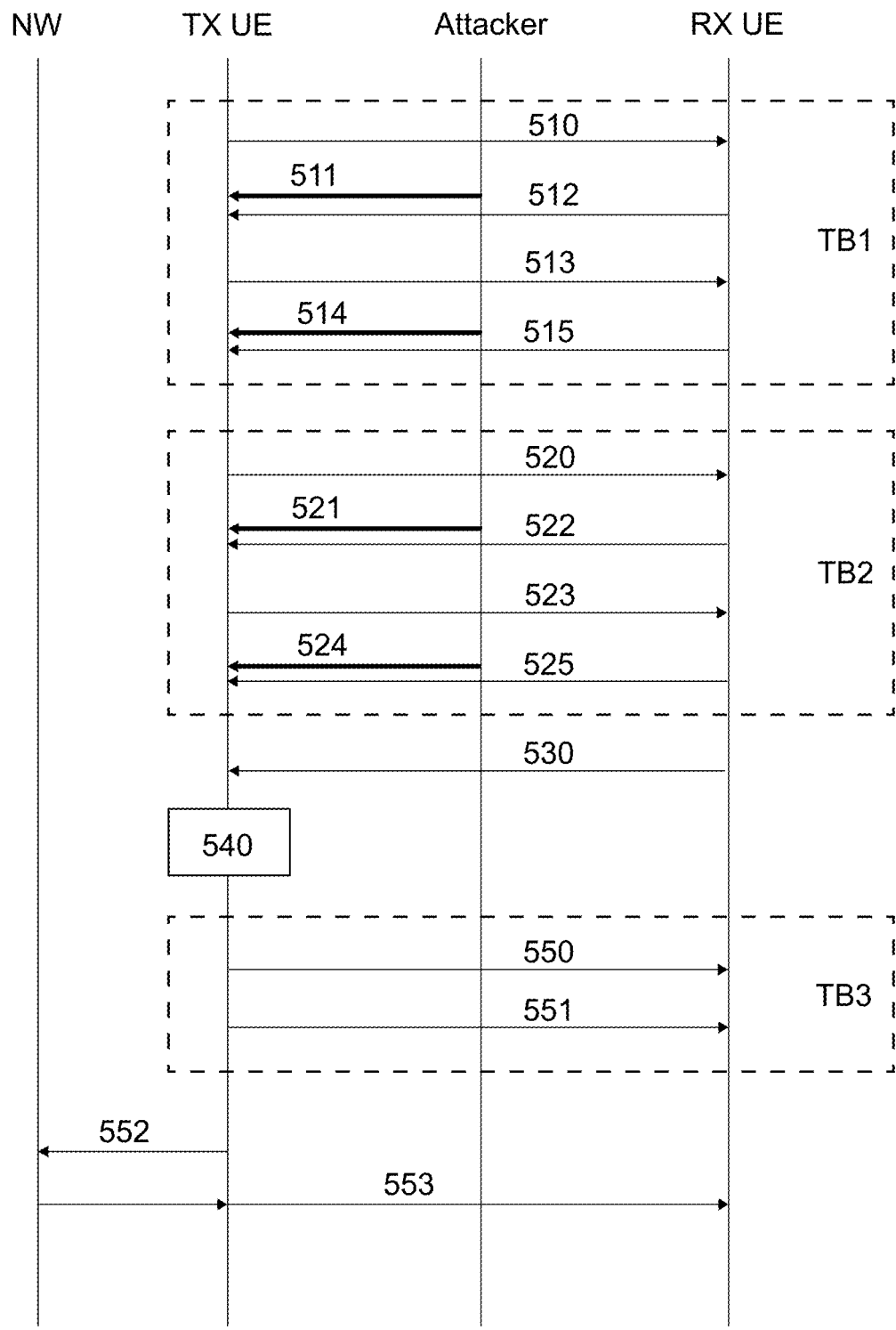
FIG. 5 shows, by way of example, signalling between devices in a sidelink communication in accordance with at least some embodiments.

FIG. 5 illustrates, by way of an example, signalling in between devices in a sidelink communication in accordance with at least some embodiments. On the vertical axes are disposed, on the left, a network, NW, a transmitter UE, TX UE, an attacker and a receiver UE, RX UE. Time advances from the top toward the bottom. The TX UE is configured to transmit SL information to the RX UE. For simplicity, a unicast SL communication between the TX UE and the RX UE is illustrated in FIG. 5. Further, FIG. 5 illustrates a case where the attacker sends fake NACK messages.

At the phase 510, a transmission of a first TB is made by the TX UE. The transmission is made over an allocated PSCCH/PSSCH. The first transport block, TB1, comprises for example $2^{nd}$ stage sidelink control information, SCI, and a corresponding data payload. The TB1 is transmitted for the first time at phase 510, e.g., over PSSCH.

At the phase 511, an attacker is able to overhear the transmission of phase 510. The attacker may decode a unicast transmission in the PSCCH/PSSCH and obtain the associated PSFCH resource. The attacker transmits a fake NACK to the TX UE via PSFCH.

At the phase 512, the legitimate receiver of the transmission, RX UE is configured to transmit an acknowledgement back to the TX UE via PSFCH. The RX UE is configured to transmit a negative acknowledgement, NACK, if the RX UE fails to decode the transport block, TB, after decoding the associated SCI. The RX UE is configured to transmit acknowledgement, ACK, if it successfully decodes the received TB.

At the phase 513, the TX UE is configured to make a retransmission of the first TB. The retransmission contains the same TB as the first transmission at phase 510 and is made over the PSCCH/PSSCH. The retransmission is made in response to receiving a NACK via the PSFCH resource.

At the phase 514, the attacker overhearing the retransmission transmits a fake NACK to the TX UE, as in phase 511.

At the phase 515, the TX UE is configured to send an acknowledgement to the TX UE, as in phase 512. Feedback or HARQ feedback send via PSFCH, like at phases 511, 512, 514, 515, is similar in response to any transmission, whether the initial or a retransmission.

The phases 510-515 are repeated for a second TB, TB2, at the phases 520-525, correspondingly. The TX UE is configured to transmit the TB2 and corresponding SCI via PSCCH/PSSCH. In addition to the legitimate receiver RX UE, the attacker overhears the transmission and sends a fake NACK as a feedback to the TX UE. Despite the feedback of the legitimate receiver RX UE, the fake NACK received from the attacker, would cause a retransmission of TB2. Again, a fake NACK is received as a feedback from the attacker.

For the previously described unicasted TBs, TB1 and TB2, from the TX UE to the RX UE, the TX UE may receive multiple NACKs from the attacker. These may be called fake NACKs, but are not distinguishable from NACKS at the TX UE, since the form and the transmission resources are the same. The received NACKs or fake NACKs may cause the TX UE to perform a retransmission of the initial transmission of TB1 or TB2, despite the feedback received from the RX UE. However, unnecessary retransmission and load may be avoided. The TX UE may store information contained in the transmitted TBs, or at least some of TBs, whose last HARQ feedback contained a NACK feedback, to a buffer. A NACK is considered as an indication of the corresponding TB not successfully received by the legitimate recipient RX UE. The TX UE may store information contained in the TBs, such as a radio link control/packet data convergence protocol, RLC/PDCP, protocol data unit, PDU, associated to an acknowledged mode, AM, radio link control, RLC, entity/dedicated radio bearer, DRB.

At the phase 530, the TX UE receives a status report. The status report may be a RLC status report or a PDCP status report, which may relate to a PDCP entity re-establishment. The TX UE may trigger a RLC status report or a PDCP entity re-establishment with the RX UE. The triggering may be based on receiving multiple NACK feedbacks over a certain time period. The number of multiple NACK feedbacks may be preconfigured at the TX UE. Alternatively, or in addition, the triggering may be based on receiving both ACK and NACK feedbacks from the allocated PSFCH resource, or from each allocated PSFCH resource, over a certain time period. Alternatively, or in addition, the triggering may be based on the TX UE discarding retransmission of one or multiple TBs, over a certain time period, wherein the discarding is due to a packet delay budget. The packet delay budget is configured to define an upper bound for the time that a packet may be delayed between the TX UE and the RX UE, and it may be used to support configurations of scheduling and link layer functions, like HARQ target operating points. The implementation may reuse the legacy procedure.

The status report, or the RLC/PDCP status report, may be triggered at the RX UE by receipt of a transmission from the TX UE, for example as described in the previous chapter. In addition, or alternatively, the status report may be performed by the RX UE autonomously. Performing of the status report by the RX UE may be based on configured trigger for sending an RLC status report during a PDCP establishment procedure as in the legacy system. Alternatively, or in addition, performing the status report may be triggered by the RX UE having received one or multiple SCIs, which indicate retransmissions although the RX UE has sent ACKs to the TX UE before. An unnecessary retransmission may be detected, for example by a new data indicator, NDI, for a considered HARQ process, which is not toggled. The number of the received one or multiple SCIs may be preconfigured at the RX UE.

At the phase 540, the TX UE is configured to compare said information contained in the status report with said stored information contained in the transmitted TB. The TX UE is configured to identify, if the stored information contained in the transmitted TBs has been received by the RX UE already. The transmitted TBs contain RLC/PDCP PDUs, which may be stored at the TX UE. For instance, it may be identified, whether RLC/PDCP PDUs contained in the one or more of the transmitted TBs have been received at the RLC/PDCP layer of the RX UE. The status report from the RX UE may contain information associated with the TB, such as the reception status of the RLC/PDCP PDU associated to an AM RLC entity/DRB. Accordingly, information contained in the transmitted TBs, like a RLC/PDCP PDU associated to an AM RLC entity/DRB, may be stored. This enables comparison of the stored data and the data of the status report at the phase 540. For example, if the TB1 or the TB2 contains a RLC/PDCP PDU #n, which has been successfully received by the RX UE according to the RLC/PDCP status report from the RX UE, then the last HARQ feedback from the RX UE for the TB1 or TB2 containing the RLC/PDCP PDU #n should be an ACK. This enables identifying that the received NACK, or the fake NACK, is not correct or desired by the RX UE. The TX UE may detect existence of an attacker, for example based on at least a configured ratio or percentage of the one or more transmitted TBs have been successfully received by the RX UE according to the received status report. A ratio or percentage of the one or more successfully received TBs may be preconfigured. In an example, a higher ratio or percentage may correspond to a lower probability for wrong detections, respectively. The preconfigured ratio or percentage may be a function of the measured CBR at the TX UE. For example, if there is a low CBR value, the TX UE may be allowed to use a lower configured ratio or percentage value, as there is a lower probability to trigger false alarm based on a wrong detection or conclusion.

At the phase 550, the TX UE is configured to transmit a TB3 with HARQ feedback disabled. The TX UE is triggered to disable use of the HARQ feedback in response to detected existence of an attacker. The TX UE may be triggered by its own implementation or by the network, NW. The blind repetitions are utilized after the phase 550 and for the further SL unicast.

At the phase 551, the TX UE is configured to transmit a blind repetition of the TB3. In addition, the TX UE may be configured to inform other UEs, or RX UEs, or the network, NW, on the existence of the attacker. The other RX UEs may be informed by the TX UE directly via SL communication, or indirectly via a NW node, e.g. via UMTS air interface, Uu. The other RX UEs, upon receiving the information, may be configured to switch to use the blind repetitions for the future, upcoming, SL transmissions. This may enable reliability. Alternatively, or in addition, the RX UEs may be triggered to perform a proposed solution in response to receiving the information. The proposed solution may be for example to behave as the TX UE and perform at least some functions of it, as described herein.

At the phase 552, the TX UE is configured to inform the NW on the existence of the attacker. The attacker is identified and known to pollute the PSFCH resources. It is further known that the RX UEs of the SL may disable the use of the HARQ feedback. In response, the NW may be configured to adapt it configurations.

At the phase 553, the NW is configured share an adapted configuration to the RX UEs of the SL. The NW may be configured to adapt its resource pool configuration. For example, less or no PSFCH resources may be configured, such that the amount of PSCCH/PSSCH resources may be increased for enabling carrying out transmissions and retransmissions for which HARQ feedback has been disabled. Alternatively, or additionally, the NW may adapt configuration of the SL logical channels/radio bearers, LCHs/RBs, according to HARQ feedback disabled mode. In this case the UEs of the SL in coverage are configured to follow the NW configuration and may be forced to use HARQ feedback disabled mode for SL communication and transmissions. In addition, the NW may be configured to trigger an alarm in response to a detected attacker. The alarm may be provided to the authority for their attention and actions to catch the illegal party and actions. The alarm may contain the location of the TX UE and/or the RX UE.

In an alternative to the RX UEs configured to switch to blind repetitions mode, the TX UE may be configured to inform the RX UEs, or its peers, to apply an offset delta, A, to the source ID. The source ID refers to a physical layer source ID, which is provided in the SCI of the TX UE transmissions. The SCI format may be 2-A/2-B. The information is provided when deriving an index of the PSFCH resource, which is to be used by the peer RX UEs for HARQ feedback to the TX UE. The offset delta, A, may be provided as part of a higher layer configuration, for example of PC5-RRC, where PC5 interface refers to one-to-many communication interface, specified for group communication, such as a SL interface.

In NR SL unicast, the PSFCH resource that is used for transmitting the HARQ feedback, depends on the PSCCH/PSSCH resource, which is used for the unicast transmission, as well as on the layer 1, L1, source ID, which is carried in the second stage SCI. In order to attack the transmission, the attacker is configured to decode both the first stage SCI, being the PSCCH, and the second stage SCI of the sender, being transmission of the TX UE.

Figure 6:
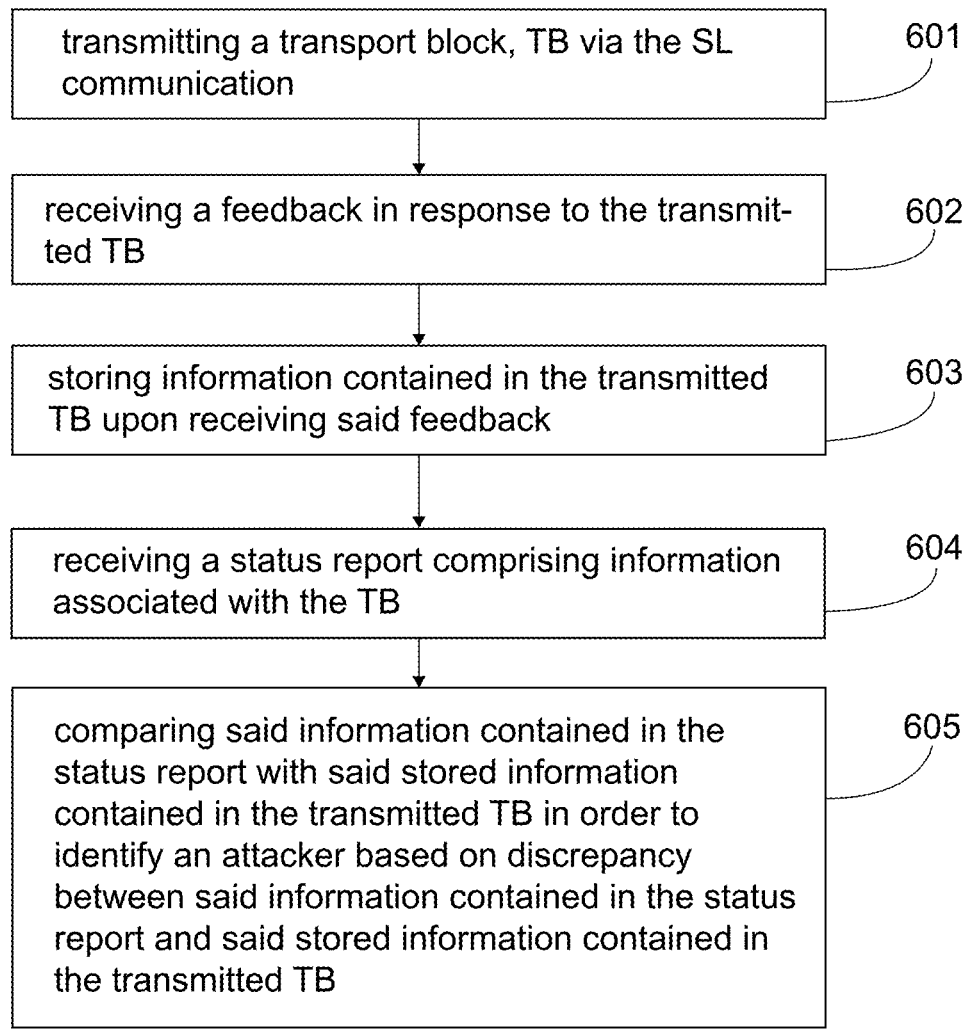
FIG. 6 shows, by way of example, a flow chart of a method in accordance with at least some embodiments.

FIG. 6 illustrates, by way of example, a flow chart of a method in accordance with at least some embodiments. The method of FIG. 6 illustrates a UE implementation in order to detect existence of an attacker in a SL communication, wherein the attacker is performing fake acknowledgements, ACK/NACK, as a HARQ feedback to a unicast SL transmission from a TX UE to a RX UE.

Method of FIG. 6 comprises TX UE transmitting a transport block, TB, via the SL communication, at phase 601. At phase 602, TX UE may receive a feedback in response to the transmitted TB. At phase 603, TX UE may store information contained in the transmitted TB upon receiving said feedback For one or more TBs transmitted form the TX UE via SL communication to the RX UE, for which last transmission or retransmission has received a NACK feedback, the content contained in the TB is stored by the TX UE. The NACK feedback indicates that the TB may not have been successfully decoded by the RX UE. The TX UE may only store the information contained in the transmitted TBs, like a radio link control, RLC/packet data convergence protocol, PDCP, protocol data unit, PDU, associated to an acknowledged mode, AM, RLC entity/dedicated radio bearer, DRB. At the previous phase 601, or between the phases 601 and 604, the TX UE may trigger a status report, which may comprise a RLC status report or a PDCP entity re-establishment with the RX UE. The triggering may be accomplished in response to the TX UE receiving multiple NACK feedbacks over a certain time period. Alternatively, or in addition, the triggering may be accomplished in response to receiving both ACK and NACK feedbacks from one or multiple PSFCH resources, or each of those, over a certain time period. Alternatively, or in addition, the triggering may be accomplished in response to a medium access protocol, MAC, layer at the TX UE has had to discard one or multiple TBs over a certain time period, where the discarding is due to PDB expiry.

The method of FIG. 6 includes receiving a status report comprising information associated with the transmitted TB at phase 604. The phase 604 may include receiving a RLC or a PDCP status report, i.e., said information associated with the transmitted TB may comprise the RLC or PDCP status report. The status report may be performed by the RX UE. In an alternative to the TX UE triggering the status report, the status report may be performed by the RX UE autonomously. The RX UE performing the status report may be based on a configured trigger for sending RLC status report during PDCP re-establishment; or upon receiving on or multiple SCIs, which indicate retransmission of a TB, for which the RX UE has sent ACKs to the TX UE. In case there is no retransmission of one or more TBs for which the RX UE has not sent ACK, the RX UE may perform a status report. This enables handling a situation of a possible fake attacker, for example sending a fake ACK.

The method of FIG. 6 includes, at phase 605, comparing said information contained in the status report with said stored information contained in the transmitted TB in order to identify an attacker based on discrepancy between said information contained in the status report and said stored information contained in the transmitted TB. The comparing includes the TX UE comparing the stored content of the TBs and the received status report. This enables determining, whether the RLC/PDCP PDUs in one or more of the TBs, as stored, have been received by the RX UE already. The TX UE may continue by detecting an existence of an attacker if at least a configured ratio or percentage of the one or more of the TBs have been successfully received by the RX UE, based on the status report, while NACK feedback has been received for the same one or more TBs. The configured ratio or percentage may be a function of a traffic load in the SL, for example a function of the measured CBR. In addition, or alternatively, existence of an attacker, which is sending face ACK feedback, may be detected if at least a configured ratio or percentage of the one or more TBs, as stored, are not received by the RX UE according to the status report.

Upon detecting an existence of an attacker, the TX UE may inform the other RX UEs and/or the NW. This may comprise informing other RX UEs directly by the SL, or via NW, for example via Uu. The informing may comprise information or instructions for handling the situation of the detected attacker. The TX UE and the RX UEs of the SL may switch to use blind repetitions for the following future SL transmissions. Alternatively, or in addition, the RX UEs may be triggered to perform a solution proposed in the information received from the TX UE. The solution proposed may include to performing actions and phases of the TX UE as described. In an alternative, the UEs in a SL communication, being the TX UE and its peers, may continue to use the HARQ feedback in an amended form, as informed by the TX UE. An offset delta, $\Delta$, may be applied to a physical layer source ID provided in the SCI format 2-A/2-B of the associated reception in order to derive an index of a PSFCH resource. Accordingly, the feedback shall be transmitted via the derived PSFCH resource. The offset delta, $\Delta$, may be agreed between the TX UE and the peers, RX UEs.

In response to receiving the information, the network, NW, may adapt its resource pool configuration. The NW may configure less or non PSFCH resources in order to increase the PSCCH/PSSCH resources. Alternatively, or in addition, the NW may be configured to disable use of HARQ feedback. The NW may adapt the configuration of the SL logical channels, LCHs/radio bearers, RBs, into a HARQ disabled mode. The NW may trigger an alarm informing NW authorities on the detected attacker.

At least some embodiments are illustrated to handle a situation, where a fake NACK is received by the TX UE. A fake ACK may be handled in a similar manner, with utilizing the same or similar information and phases. With similar embodiments and comparison of data, it may be possible to identify an attacker based on one or more feedback, for example, receiving both ACK and NACK feedback for a unicast transmission and status report. Even a unicast transmission is illustrated for simplicity, the same is applicable to a SL with multiple recipients. The status reports may be received from, or based on data of, multiple RX UEs.

The phases of the illustrated method may be performed in a user device, in an IoT device, an auxiliary device or a communication network device, for example, or in a control device configured to control the functioning thereof, when installed therein.

An example method for a SL communication comprises transmitting a transport block, TB, via the SL communication, possibly to an attacker and RX UE. The method may further comprise receiving a feedback in response to the transmitted TB, at least from the attacker. Also, the method may comprise storing information contained in the transmitted TB upon receiving said feedback. In addition, the method may comprise receiving a status report comprising information associated with the TB, wherein the status report is possibly received from RX UE. Finally, the method may comprise comparing said information contained in the status report with said stored information contained in the transmitted TB in order to identify an attacker based on discrepancy between said information contained in the status report and said stored information contained in the transmitted TB. The method may be for TX UE, i.e., the method steps may be performed by TX UE. In addition the method may comprise one or more of the following:

transmitting the TB on a physical sidelink control channel, PSCCH/physical sidelink shared channel, PSSCH; and/or receiving the feedback on a physical sidelink feedback channel, PSFCH, associated with the PSCCH/the PSSCH;

transmitting the TB to one or more receivers;

the feedback comprises a hybrid automatic repeat request, HARQ, feedback;

the information contained in the TB contains a radio link control, RLC/packet data convergence protocol, PDCP, protocol data unit, PDU;

the RLC/PDCP PDU is associated to an acknowledged mode, AM, RLC entity/dedicated radio bearer, DRB;

the status report comprises a RLC status report or a PDCP status report;

triggering the status report based on receiving multiple negative acknowledgement, NACK, feedbacks over a certain time period, optionally via the one or more physical sidelink feedback channels, PSFCH resources.

triggering the status report based on receiving both an acknowledgement, ACK, and a negative acknowledgement, NACK, feedbacks over a certain time period from the one or more physical sidelink feedback channel, PSFCH;
triggering the status report based on discarding retransmission of one or multiple TBs, over a certain time period, wherein the discarding is due to a packet delay budget;
receiving the status report during a PDCP establishment or re-establishment procedure, from a receiver of the TB, wherein triggering the status report is optionally based on configured trigger for sending an RLC status report during a PDCP establishment procedure, optionally according to a legacy system;
receiving the status report in response to transmitting one or multiple sidelink control information, SCI, indicating retransmission of the TB, for which optionally TBs acknowledgement, ACK, feedback has been received from one or more legitimate recipient;
receiving the status report in response to a receiver of the TB detecting a retransmission in response to a send acknowledgement, ACK, feedback, based on a new data indicator, NDI, for the feedback process, which is not toggled;
comparing the status report with the stored TBs comprises at least one of the following:
identifying, whether the stored TBs have been received by the one or more legitimate recipients,
identifying, whether a radio layer control RLC/packet data convergence protocol PDCP, packet data units, PDUs, contained in the one or more stored TBs have been received at the RLC/PDCP layer,
identifying, if a first transfer packet, TB1 contains a RLC/PDCP PDU #n which has been successfully received by a legitimate receiver according to RLC/PDCP status report information, and comparing the same to the last received feedback for the TB1, containing the RLC/PDCP PDU #n,
the status report includes reception status of a radio link control/packet data convergence protocol, RLC/PDCP, PDU associated to an acknowledged mode, AM, radio link control, RLC, entity/dedicated radio bearer, DRB,
preconfigured ratio or percentage of one or more stored TBs, which are successfully received according to the status report may be used for comparison data for identifying the attacker.
the preconfigured ratio or percentage comprises a function of a measured channel busy ratio, CBR;
transmitting an information of the detected attacker to receivers and/or NW.
the information of the detected attacker comprises instructions for handling the situation;
the information of the detected attacker comprises instruction to apply an offset delta to a source identifier provided in the sidelink control information, SCI;
disabling the feedback in response to detecting the attacker;
replacing the feedback enabled retransmissions by blind repetitions;
continuing the SL communication with adapted NW resources including at least one of:
adapted resource pool configurations for the SL communication,
reduced or no physical sidelink feedback channel, PSFCH, resources,
increased physical sidelink control channel, PSCCH/physical sidelink shared channel, PSSCH, resources,
disabled hybrid automatic repeat request, HARQ, feedback, and
adapted configuration of the SL logical channels/radio bearers, LCHs/RBs, which adapted in accordance to the disabled feedback mode.

In addition to the previous method steps, there is provided an apparatus configured to perform the method, a (non-transitory) computer readable medium comprising program instructions that, when executed by at least one processor, cause an apparatus to perform the method, and a computer program configured to cause the method to be performed.

The illustrated examples and embodiments are not necessarily indicative of the order of processing or performing steps or phases. For example, some phases may be performed in a different order and/or in parallel. In addition, some configurations or pre-configurations may take place by using signalling, for example in upper layer messages.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, phases, etc. In other instances, well-known structures or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The open limitations include the closed limitations as defined. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

ACK Acknowledgement
AM Acknowledged Mode
BS Base Station
CBR Channel Busy Ratio
DRB Dedicated Radio Bearer
HARQ Hybrid Automatic Repeat Request
IC In Coverage
ID Identifier
L1 Layer 1
LCH Logical Channel
LTE Long-Term Evolution
NACK Negative Acknowledgement
NR New Radio
NW Network
OoC Out of Coverage
PDCP Packet Data Convergence Protocol
PSCCH Physical Sidelink Control Channel
PSFCH Physical Sidelink Feedback Channel
PSSCH Physical Sidelink Shared Channel
RB Radio Bearer
reTX Retransmission
RLC Radio Link Control
RX UE Receiver User Equipment
SCI Sidelink Control Information
SL Sidelink
TB Transport Block
TX UE Transmitter User Equipment
UE User Equipment

The invention claimed is:

1. An apparatus comprising:
at least one processor; and
at least one memory storing instructions that, when executed by the at least one processor, cause the apparatus at least to perform:
transmitting a transport block, TB, via sidelink, SL, communication,
receiving a feedback in response to the transmitted TB,
storing information contained in the transmitted TB upon receiving said feedback,
receiving a status report comprising information associated with the TB, and
comparing said information contained in the status report with said stored information contained in the transmitted TB in order to identify an attacker based on discrepancy between said information contained in the status report and said stored information contained in the transmitted TB.

2. The apparatus according to claim 1, wherein the status report comprises a RLC status report or a PDCP status report.

3. The apparatus according to claim 1, wherein said information contained in the TBs comprises a radio link control, RLC/packet data convergence protocol, PDCP, protocol data unit, PDU; and/or wherein the status report includes reception status of a radio link control/packet data convergence protocol, RLC/PDCP, protocol data unit, PDU; wherein optionally the RLC/PDCP PDU is associated to an acknowledged mode, AM, RLC entity/dedicated radio bearer, DRB.

4. The apparatus according to claim 1, wherein the at least one processor and the at least one memory storing instructions that, when executed by the at least one processor, cause the apparatus to further perform: triggering the status report based on at least one of the following: —receiving multiple negative acknowledgement, NACK, feedbacks over a certain time period, via the one or more physical sidelink feedback channels, PSFCH resources, —receiving both an acknowledgement, ACK, and a negative acknowledgement, NACK, feedbacks over a certain time period from the one or more physical sidelink feedback channel, PSFCH, resources-discarding retransmission of one or multiple TBs, over a certain time period, wherein the discarding is due to a packet delay budget.

5. The apparatus according to claim 1, wherein the apparatus is further configured to performat least one of:
receiving the status report during a packet data convergence protocol, PDCP, establishment or re-establishment procedure, form a receiver of the TB, wherein triggering the status report is optionally based on configured trigger for sending an RLC status report during a PDCP establishment procedure, optionally according to a legacy system,
receiving the status report in response to transmitting one or multiple sidelink control information, SCI, indicating retransmission of the TB, for which optionally TBs acknowledgement, ACK, feedback has been received from one or more legitimate recipient,
receiving the status report in response to a receiver of the TB detecting a retransmission in response to a send acknowledgement, ACK, feedback, based on a new data indicator, NDI, for the feedback process, which is not toggled.

6. The apparatus according to claim 1, wherein the apparatus is further configured to compare the status report with the stored TBs by performing at least one of the following:
identifying, whether the stored TBs have been received by the one or more legitimate recipients,
identifying, whether a radio layer control RLC/packet data convergence protocol PDCP, packet data units, PDUs, contained in the one or more stored TBs have been received at the RLC/PDCP layer, and
identifying, if a first transfer packet, TB1 contains a RLC/PDCP PDU #n which has been successfully received by a legitimate receiver according to RLC/PDCP status report information, and comparing the same to the last received feedback for the TB1, containing the RLC/PDCP PDU #n.

7. The apparatus according to claim 1, comprising preconfigured ratio or percentage of one or more stored TBs, which are successfully received according to the status report and used for comparison data for identifying the attacker, wherein optionally the preconfigured ratio or percentage comprises a function of a measured channel busy ratio, CBR.

8. The apparatus according to claim 7, wherein the at least one processor and the at least one memory storing instructions that, when executed by the at least one processor, cause the apparatus to further perform: transmitting an information of the detected attacker to receivers and/or to network.

9. The apparatus according to claim 8, wherein the information of the detected attacker comprises at least one of:
   instructions for handling the situation,
   instruction to apply an offset delta to a source identifier provided in the sidelink control information, SCI.

10. The apparatus according to claim 1, wherein the at least one processor and the at least one memory storing instructions that, when executed by the at least one processor, cause the apparatus to further perform: disabling the feedback in response to detecting the attacker, optionally further including:
   replacing the feedback enabled retransmissions by blind repetitions.

11. The apparatus according to claim 1, wherein the at least one processor and the at least one memory storing instructions that, when executed by the at least one processor, cause the apparatus to further perform: continuing the SL communication with adapted NW resources including at least one of:
   adapted resource pool configurations for the SL communication,
   reduced or no physical sidelink feedback channel, PSFCH, resources,
   increased physical sidelink control channel, PSCCH/physical sidelink shared channel, PSSCH, resources,
   disabled hybrid automatic repeat request, HARQ, feedback, and
   adapted configuration of the SL logical channels/radio bearers, LCHs/RBs, which adapted in accordance to the disabled feedback mode.

12. A method for a sidelink, SL, communication, comprising:
   transmitting a transport block, TB, via the SL communication,
   receiving a feedback in response to the transmitted TB,
   storing information contained in the transmitted TB upon receiving said feedback,
   receiving a status report comprising information associated with the TB, and
   comparing said information contained in the status report with said stored information contained in the transmitted TB in order to identify an attacker based on discrepancy between said information contained in the status report and said stored information contained in the transmitted TB.

13. The method according to claim 12, wherein the status report comprises a RLC status report or a PDCP status report.

14. The method according to claim 12, wherein said information contained in the TBs comprises a radio link control, RLC/packet data convergence protocol, PDCP, protocol data unit, PDU; and/or wherein the status report includes reception status of a radio link control/packet data convergence protocol, RLC/PDCP, protocol data unit, PDU; wherein optionally the RLC/PDCP PDU is associated to an acknowledged mode, AM, RLC entity/dedicated radio bearer, DRB.

15. The method according to claim 12, further comprising triggering the status report based on at least one of the following: —receiving multiple negative acknowledgement, NACK, feedbacks over a certain time period, via the one or more physical sidelink feedback channels, PSFCH resources, —receiving both an acknowledgement, ACK, and a negative acknowledgement, NACK, feedbacks over a certain time period from the one or more physical sidelink feedback channel, PSFCH, resources-discarding retransmission of one or multiple TBs, over a certain time period, wherein the discarding is due to a packet delay budget.

16. The method according to claim 12, further comprising at least one of:
   receiving the status report during a packet data convergence protocol, PDCP, establishment or re-establishment procedure, form a receiver of the TB, wherein triggering the status report is optionally based on configured trigger for sending an RLC status report during a PDCP establishment procedure, optionally according to a legacy system,
   receiving the status report in response to transmitting one or multiple sidelink control information, SCI, indicating retransmission of the TB, for which optionally TBs acknowledgement, ACK, feedback has been received from one or more legitimate recipient,
   receiving the status report in response to a receiver of the TB detecting a retransmission in response to a send acknowledgement, ACK, feedback, based on a new data indicator, NDI, for the feedback process, which is not toggled.

17. The method according to claim 12, further comprising comparing the status report with the stored TBs by performing at least one of the following:
   identifying, whether the stored TBs have been received by the one or more legitimate recipients,
   identifying, whether a radio layer control RLC/packet data convergence protocol PDCP, packet data units, PDUs, contained in the one or more stored TBs have been received at the RLC/PDCP layer, and
   identifying, if a first transfer packet, TB1 contains a RLC/PDCP PDU #n which has been successfully received by a legitimate receiver according to RLC/PDCP status report information, and comparing the same to the last received feedback for the TB1, containing the RLC/PDCP PDU #n.

18. The method according to claim 12, further comprising preconfigured ratio or percentage of one or more stored TBs, which are successfully received according to the status report and used for comparison data for identifying the attacker, wherein optionally the preconfigured ratio or percentage comprises a function of a measured channel busy ratio, CBR.

19. A non-transitory computer readable medium comprising program instructions that, when executed by an apparatus, cause the apparatus to perform at least the following:
   to transmit a transport block, TB, via the SL communication,
   to receive a feedback in response to the transmitted TB,
   to store information contained in the transmitted TB upon receiving said feedback,
   to receive a status report comprising information associated with the TB, and
   to compare said information contained in the status report with said stored information contained in the transmitted TB in order to identify an attacker based on discrepancy between said information contained in the status report and said stored information contained in the transmitted TB.

* * * * *